(12) United States Patent
Zubic et al.

(10) Patent No.: US 11,355,038 B2
(45) Date of Patent: Jun. 7, 2022

(54) SYSTEM FOR REPLACEABLE ADVERTISEMENTS

(71) Applicant: ADONTHEMOVE, LLC, Orlando, FL (US)

(72) Inventors: Dragan Zubic, Aurora, IL (US); Sukjoong Oh, Seongnam (KR); James Andrew Kindel, Chicago, IL (US)

(73) Assignee: ADONTHEMOVE, LLC, Orlando, FL (US)

( * ) Notice: Subject to any disclaimer, the term of this patent is extended or adjusted under 35 U.S.C. 154(b) by 20 days.

(21) Appl. No.: 17/100,503

(22) Filed: Nov. 20, 2020

(65) Prior Publication Data

US 2021/0150948 A1 May 20, 2021

Related U.S. Application Data

(60) Provisional application No. 62/937,854, filed on Nov. 20, 2019.

(51) Int. Cl.
| | |
|---|---|
| *G09F 21/04* | (2006.01) |
| *G09F 9/30* | (2006.01) |
| *G09F 13/04* | (2006.01) |
| *G09F 9/302* | (2006.01) |
| *B60P 3/025* | (2006.01) |

(52) U.S. Cl.
CPC ............ *G09F 21/048* (2013.01); *G09F 9/30* (2013.01); *B60P 3/0255* (2013.01); *G09F 9/3026* (2013.01); *G09F 13/044* (2021.05); *G09F 13/0445* (2021.05)

(58) Field of Classification Search
CPC ........ G09F 21/048; G09F 9/30; G09F 9/3026; G09F 13/044; G09F 13/0445; G09F 21/041; B60P 3/0255
See application file for complete search history.

(56) References Cited

U.S. PATENT DOCUMENTS

| | | | | |
|---|---|---|---|---|
| 9,830,885 | B2 * | 11/2017 | Cross | G09G 5/14 |
| 11,011,084 | B1 * | 5/2021 | Hemphill | H01R 13/6205 |
| 11,059,356 | B2 * | 7/2021 | Schuh | B62D 35/001 |
| 11,087,645 | B1 * | 8/2021 | Hockett | G09F 21/048 |
| 2017/0192733 | A1 * | 7/2017 | Huang | G06F 3/1431 |
| 2018/0295406 | A1 * | 10/2018 | Hernandez | H04N 21/42202 |

FOREIGN PATENT DOCUMENTS

GB 2540862 A * 2/2017 ........... G09F 21/048

* cited by examiner

*Primary Examiner* — Cassandra Davis

(74) *Attorney, Agent, or Firm* — K&L Gates LLP

(57) ABSTRACT

An electronic display device includes: a chassis including a plurality of mounting elements and an antenna, a power supply, a controller, a media player, a gateway, and a terminal; and a display panel comprising a plurality of display modules mounted to the mounting elements, wherein each display module includes a video display on a front surface of the display module and is positioned relative to the chassis using one or more locating pins located on a back surface of the display module that cooperate with one or more receiving holes in a front surface of the mounting elements, is magnetically secured to the chassis, and is locked in place relative to each respective mounting element using a locking mechanism, such that each individual display module may be secured or removed from the chassis independently; wherein the controller causes the media player to display media content on the display panel.

9 Claims, 5 Drawing Sheets

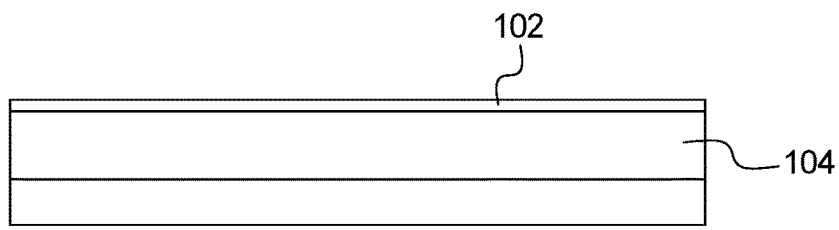
FIG. 7
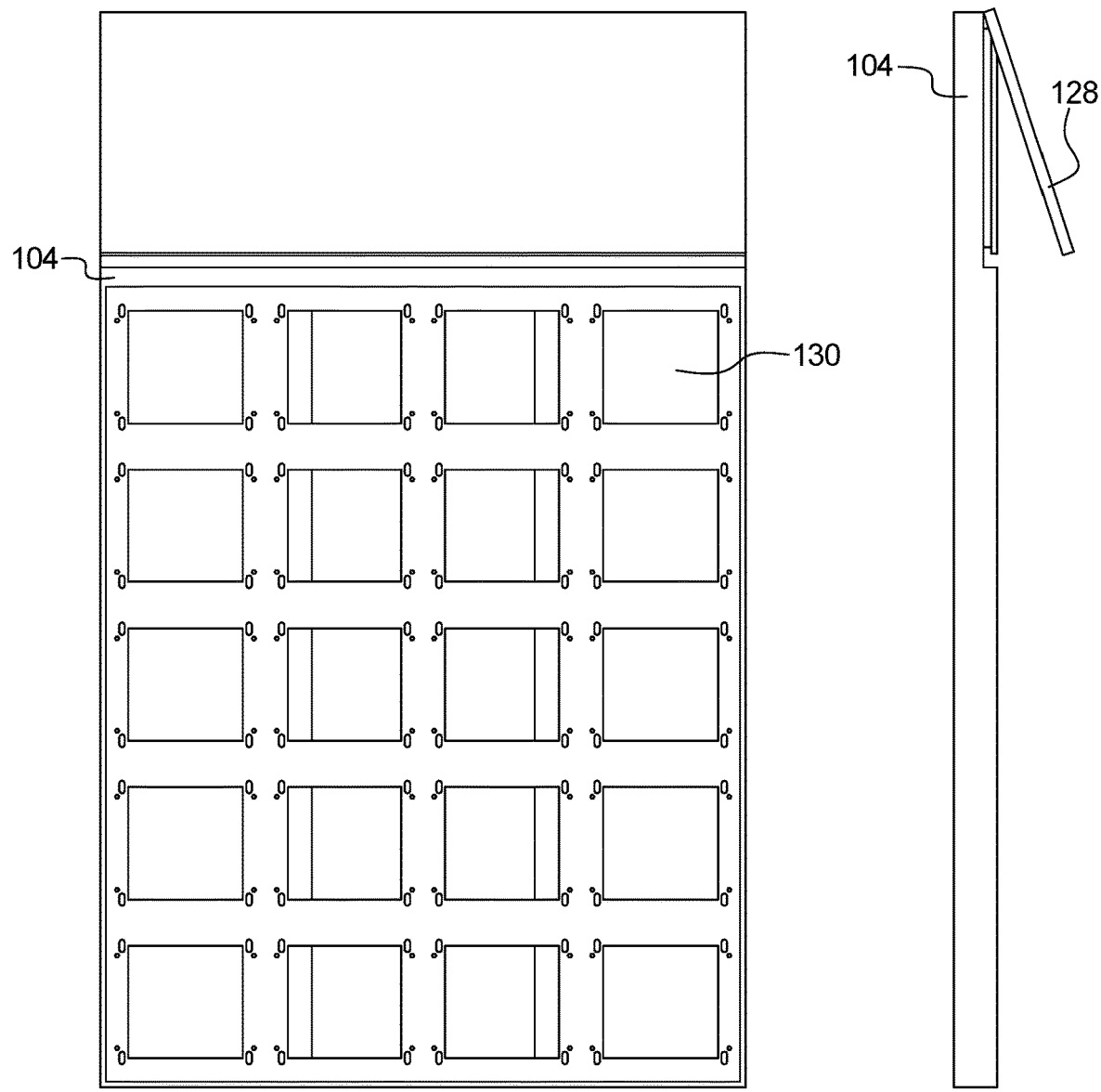
FIG. 6
FIG. 8

SYSTEM FOR REPLACEABLE ADVERTISEMENTS

CROSS-REFERENCE TO RELATED APPLICATIONS

This application claims the benefit of priority to U.S. Provisional Application No. 62/937,854 filed Nov. 20, 2019, the entirety of which is incorporated herein by reference.

BACKGROUND OF THE INVENTION

The present subject matter relates generally to advertisement systems for use on billboards and moving vehicles. More specifically, the present subject matter provides systems for securely mounting weatherproof display modules to a chassis attached to the back of a semi-tractor trailer to provide digital advertising display panels.

Conventional advertisement displays used on billboards and the sides of vehicles require advertisements to be manually printed or painted directly onto the surface of the automobile or billboard. Such advertisements are expensive to create and also expensive and time consuming to replace. Further, an advertisement painted on an outer surface of an automobile or billboard is exposed to weather elements (e.g., sun, rain, etc.) and road debris that can damage the advertisement. Accordingly, over time, the painted display may fade or peel as a result of the exposure.

Similarly, vinyl graphics can be applied to a vehicle to provide advertising. While these graphics may be more weather resistant than an advertisement painted on a vehicle, they still suffer from being a static image.

To address these issues, digital billboards have been introduced, particularly for use in stationary installations, both indoor and outdoor. However, it has not been economical, safe, secure, and practical to mount digital billboards and advertisements on the back of moving vehicles, such as semi-tractor trailers.

Accordingly, there is a need for an economical, secure, durable, and protected advertisement system for use with vehicles.

BRIEF SUMMARY OF THE INVENTION

The present disclosure provides an advertisement system for displaying digital graphics on truck doors, truck sides, trailer, drones, any moving vehicle, planes and/or billboards. Various examples of the systems and methods are provided herein.

In a primary example, the advertisement system includes a chassis mounted flush to each of the swinging back doors of a semi-tractor trailer. Each chassis fits over the vertical rear locking bar or bars on the back doors of the trailer. To make the unit adaptable for use with a wider range of doors, the system's chassis may include a cutout that is large enough for at least two locking bars to pass through, even when accounting for the variance in size and spacing of locking bars.

In the primary example, each chassis is mounted directly to the respective trailer door using a number of nuts and bolts. For example, it is contemplated that in a standard installation, nine bolts may be used to secure each chassis to its respective door.

The chassis may include, for example, a number of mounting brackets, mounting sockets or similar mounting elements that enable a plurality of display modules to mount to the chassis to form the display panel. Each display panel may include a large number of display modules, for example 10-30 (e.g., 15, 20, 25, 30), that are held in place on its chassis by magnets. The magnets are useful in securing the display modules to the chassis and reducing the vibrational effects that may otherwise be present if using non-magnet, mechanical fasteners. Reducing vibrational stress on the display modules is particularly advantageous when mounting on a moving vehicle, as the system is subject to vibrations from the road, the engine, braking, etc.).

The display modules may further be locked into place using a number of locking bars or similar locking mechanisms that provide additional mechanical coupling to supplement the magnet coupling. In a primary example, each display module includes four locking bars that lock each display module to a respective mounting bracket on the chassis.

Moreover, each display module may be located on the chassis, and relative to its respective mounting bracket, using one or more locating pins. The use of such pins enables easier alignment of the display modules and help to provide a more consistent display surface.

Each display module can be encased in silicone to further protect the display modules from weather and vibrational damage. The encasing eliminates the need for a protective glass cover, which helps to reduce the weight of the present system when compared to conventional systems.

In the primary example, the chassis houses various electronic components (e.g., power supply, controller, media player, gateway, terminal, GPS/cellular/Wi-Fi antenna, etc.). In some examples, these components are housed within a locking panel located above (or otherwise adjacent to) the display panel.

The electronic components may communicate to the display modules on each panel through wired or wireless connections, as will be recognized by those skilled in the art based on the descriptions provided herein.

Digital advertisements or other media content can be displayed on the display panels when the truck is in motion or at rest. Such media can be static or dynamic. In addition, the content can be dynamic in response to external communication to the system or triggered by GPS, or geofencing, parameters. For example, an advertisement can be received by a system controller via a wireless communication protocol for immediate or scheduled display. Additionally, stored or streamed content may be displayed in response to triggers resulting from GPS data. For example, when the truck moves into a prescribed geofenced zone, a first advertisement may be displayed. When the truck moves to a second prescribed geofenced zone (or simply exits the first), a second advertisement may be displayed. As a result, manual replacement of the advertisements is not needed. This allows the system to respond instantly to replace the displayed media content via broadcast, direct communication, and/or location-based services.

In one embodiment, an electronic display device includes: a chassis including a plurality of mounting elements and an antenna, a power supply, a controller, a media player, a gateway, and a terminal; and a display panel comprising a plurality of display modules mounted to the mounting elements, wherein each display module includes a video display on a front surface of the display module and is positioned relative to the chassis using one or more locating pins located on a back surface of the display module that cooperate with one or more receiving holes in a front surface of the mounting elements, is magnetically secured to the chassis, and is locked in place relative to each respective mounting element using a locking mechanism, such that each individual display module may be secured or removed from the chassis independently; wherein the controller causes the media player to display media content on the display panel.

Each display module may include an LED video display. At least the front surface of each display module may be covered by a silicone covering. The chassis may be secured to a rear door of a semi-tractor trailer. The chassis may include a channel that accommodates one or more vertical locking bars that span a height of the chassis. The media content displayed on the display panel may be updated in response to geolocation data received through the antenna.

In another embodiment, an electronic display device includes: a first chassis and a second chassis, each mounted to a respective first and second rear door of a semi-tractor trailer, wherein each chassis includes a plurality of mounting elements and at least one of the first chassis and the second chassis includes an antenna, a power supply, a controller, a media player, a gateway, and a terminal, further wherein each chassis includes a channel that accommodates one or more vertical locking bars that span a height of the chassis; and a first display panel and a second display panel, each comprising a plurality of display modules mounted to the mounting elements of the first chassis and the second chassis, wherein each display module includes a video display on a front surface of the display module and is positioned relative to the chassis using one or more locating pins located on a back surface of the display module that cooperate with one or more receiving holes in a front surface of the mounting elements, is magnetically secured to the chassis, and is locked in place relative to each respective mounting element using a locking mechanism, such that each individual display module may be secured or removed from the chassis independently, further wherein at least the front surface of each display module is covered by a silicone covering; wherein the controller causes the media player to display media content on the first display panel and second display panel. The media content displayed on the first display panel and second display panel may be updated in response to geolocation data received through the antenna.

An advantage of the present system is that it provides a safe and secure mounting system that makes the advertising system difficult to steal.

Another advantage of the present system is that the display panels mount independently to each door without obstructing the standard vertical locking bars, thereby allowing each trailer door to freely open and close (and lock), while mounting the chassis flat to the trailer door.

Yet another advantage of the present system is that the total depth of the mounted display panels is relative shallow (approximately less than three inches), which reduces the risk of damage to the advertising panels when the trailer is backing into loading docks.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 6 illustrates a front view of the mounted chassis further illustrating an embodiment having a plurality of mounting elements for mounting display modules.

FIG. 7 illustrates a top view of the chassis in FIG. 6.

FIG. 8 illustrates a side view of the chassis in FIG. 6, with a top access panel swinging to an open position.

DETAILED DESCRIPTION OF THE INVENTION

The present system is an intelligent mobile outdoor media platform that can be used in conjunction with billboards and/or trailer doors on trucks, drones, planes, or any vehicle. The primary embodiment described herein is for use on the rear swinging doors of a semi-tractor trailer.

Figure 1:
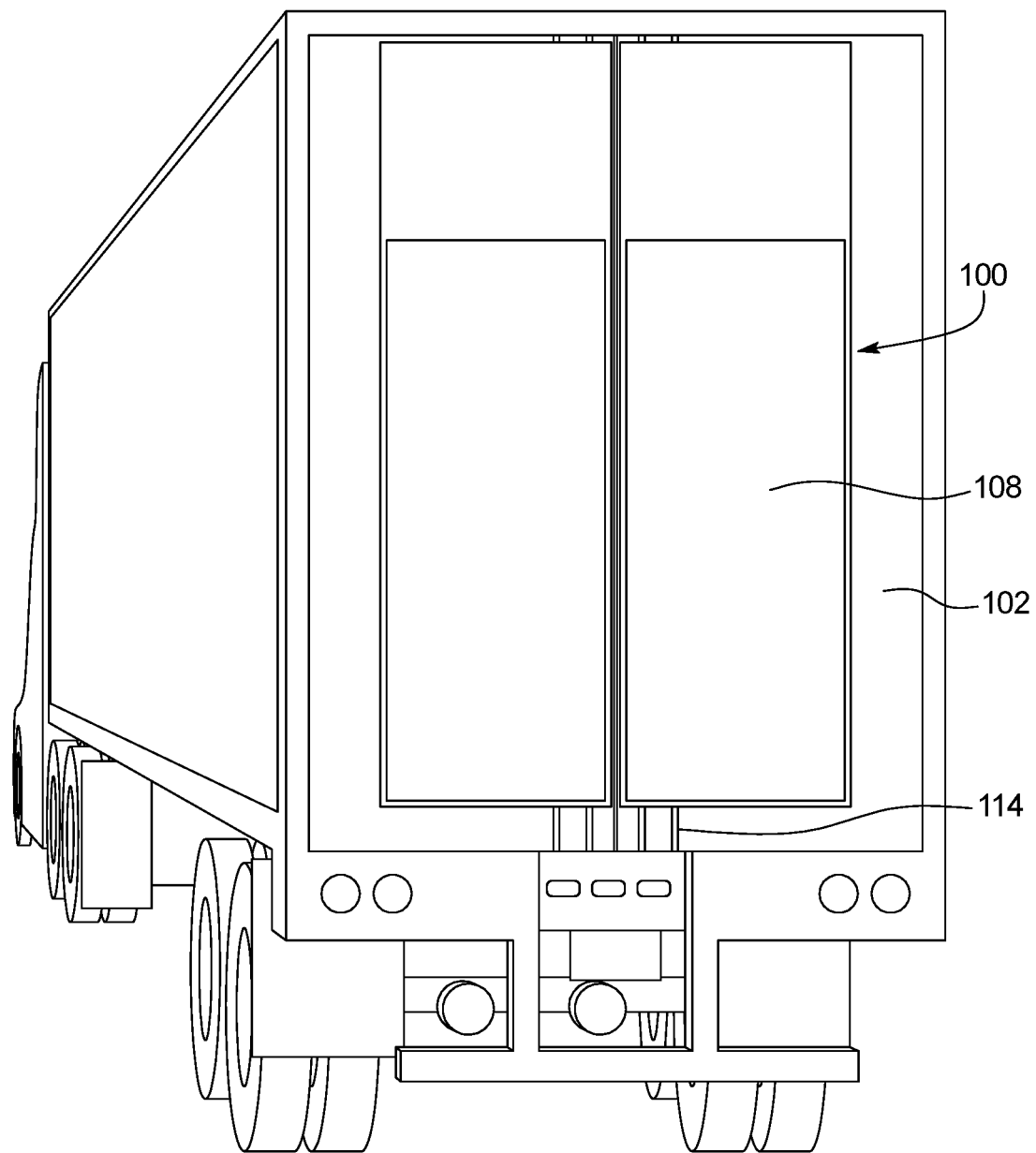
FIG. 1 is an example of an advertisement system according to teachings provided herein mounted to the rear doors of a semi-tractor trailer such that its display panels ca display various electronic advertisements.

FIG. 1 illustrates an advertisement system 100 mounted to the rear doors of a semi-tractor trailer 102 such that it ca display various electronic advertisements, as described further herein.

Figure 2:
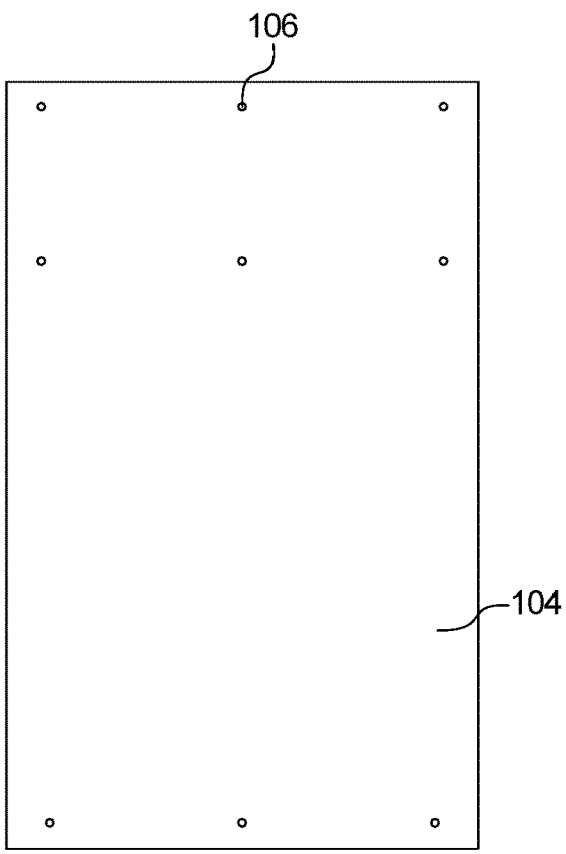
FIG. 2 illustrates a front view of a chassis mounted to a rear door of the trailer.

FIG. 2 illustrates a front view of a chassis 104 mounted to a rear door of the trailer 102. In the example shown, the chassis 104 mounts to the trailer 102 using a series of nine bolts 106. However, it is understood that there are numerous mechanisms that may be implemented to secure each chassis 104 to each door of the trailer 102.

Figure 3:
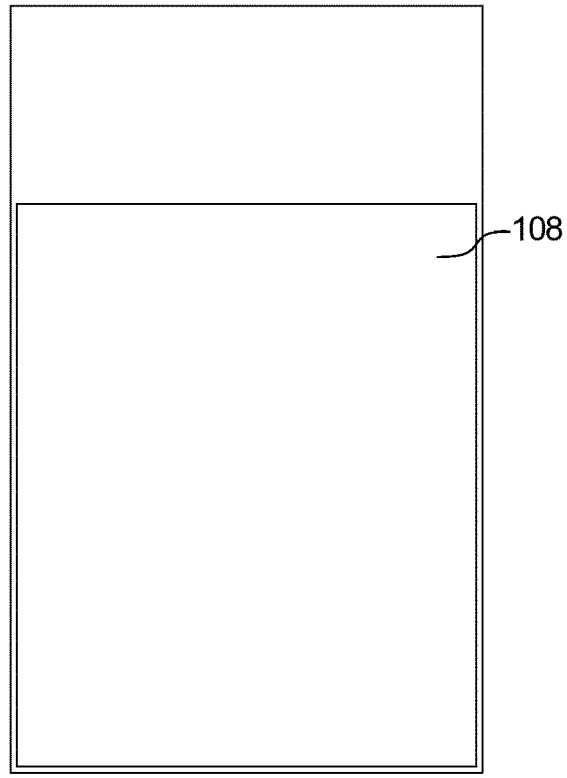
FIG. 3 illustrates a front view of a display panel mounted to the chassis.

FIG. 3 illustrates a front view of a display panel 108 comprising a plurality of display modules 110 (FIGS. 11-14) mounted to the chassis 104.

Figure 4:
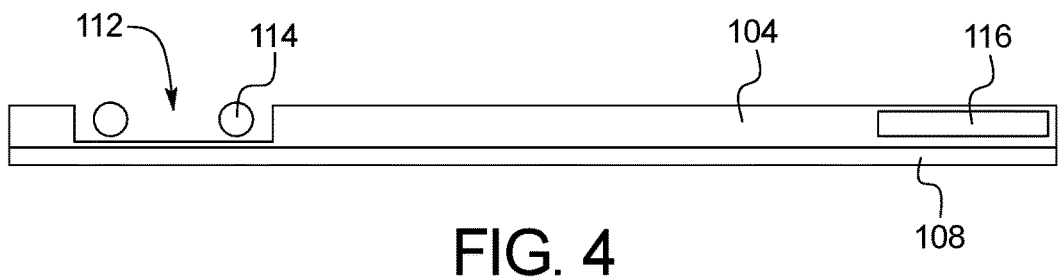
FIG. 4 illustrates a bottom view of a display panel mounted to the chassis.

FIG. 4 illustrates a bottom view of a display panel 108 mounted to the chassis 104. This view shows that a portion of the chassis 104 forms a channel 112 to allow vertical rear locking bars 114 on the trailer 102 to pass through the chassis 104, enabling the chassis 104 to mount flat to the trailer 102. As further shown in FIG. 4, the chassis 104 may include an antenna 116 (e.g., cellular, GPS, Wi-Fi, etc.) to enable communication to and from the display panel 108.

Figure 5:
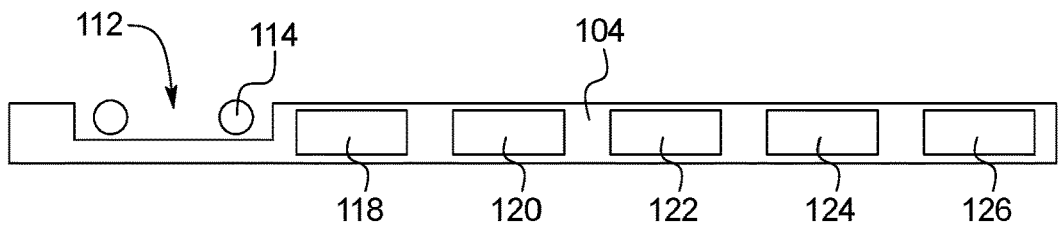
FIG. 5 illustrates a top view of a display panel mounted to the chassis.

FIG. 5 illustrates a top view of the display panel 108 mounted to the chassis 104. This view further shows that a portion of the chassis 104 forms a channel 112 to allow vertical rear locking bars 114 on the trailer 102 to pass through the chassis 104, enabling the chassis 104 to mount flat to the trailer 102.

As further shown in FIGS. 4 and 5, the chassis 104 may include various electronic components, such as, for example, an antenna 116 (e.g., cellular, GPS, Wi-Fi, etc.) to enable communication to and from the system 100, a power supply 118, a controller 120 controlling operations of the system 100, a media player 122 for outputting media to the display panel 108, a gateway 124 for regulating communication data, and a terminal 126 enabling user access to the computing systems described herein. These components may be housed, for example, in a locking panel 128 located above (or otherwise adjacent to) the display panel 108.

FIG. 6 illustrates a front view of an embodiment of the chassis 104 including a plurality of mounting elements 130 for mounting display modules 110. The outing elements 130 provide the structure to which the display modules mount, as described further with respect to FIGS. 11-14 below.

Figure 9:
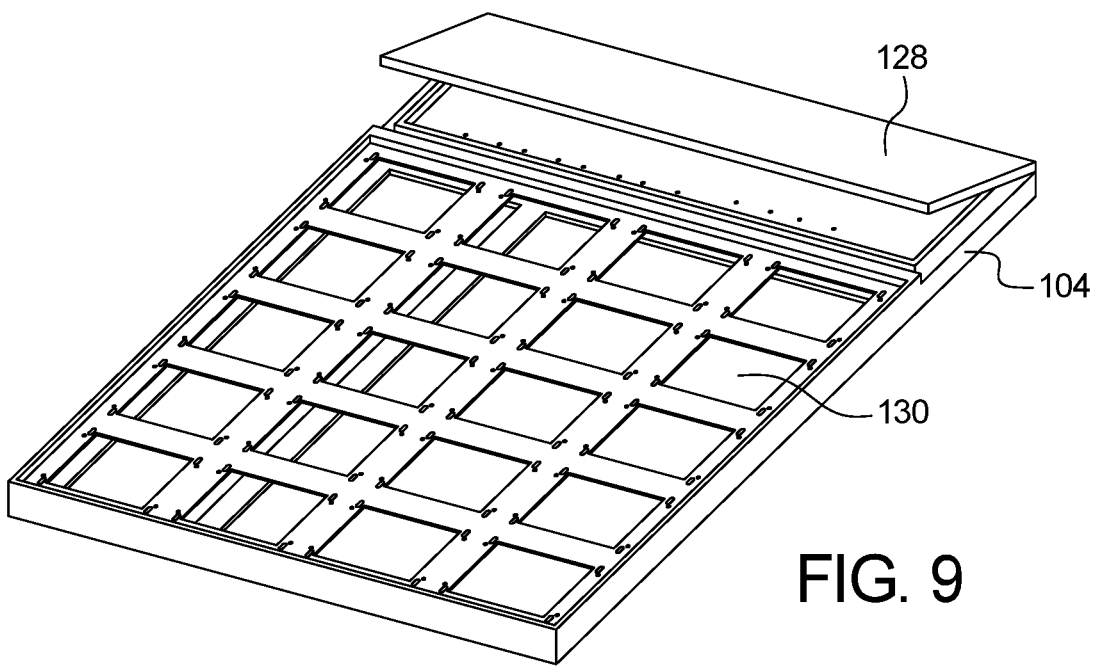
FIG. 9 illustrates an isometric front view of the chassis in FIG. 6.
Figure 10:
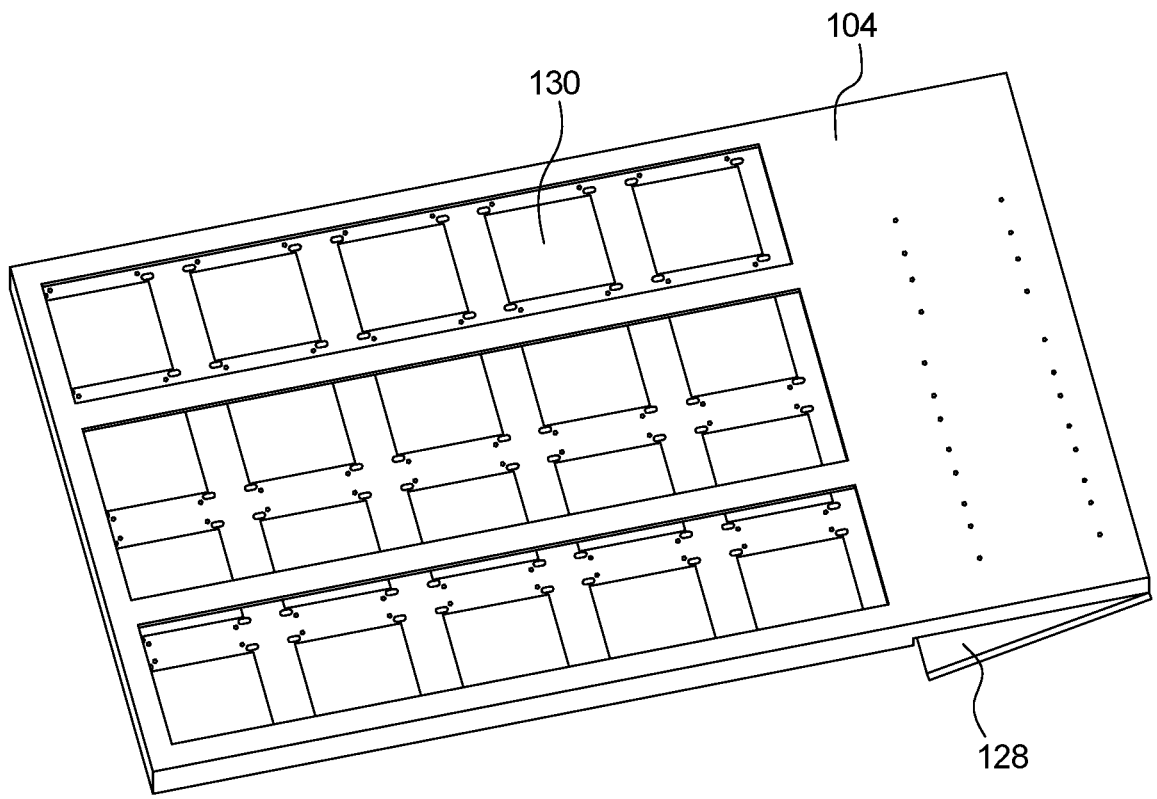
FIG. 10 illustrates an isometric back view of the chassis in FIG. 6.

FIG. 7 illustrates a top view of the chassis 104 in FIG. 6. FIG. 8 illustrates a side view of the chassis 104 in FIG. 6, with a locking top access panel 128 swinging to an open position. FIG. 9 illustrates an isometric front view of the chassis 104 in FIG. 6. FIG. 10 illustrates an isometric back view of the chassis 104 in FIG. 6.

As shown in FIGS. 6-10, the chassis 104 may include, for example, a number of mounting brackets, mounting sockets or similar mounting elements 130 that enable a plurality of display modules 110 to mount to the chassis 104 to form the display panel 108. Each display panel 108 may include a large number of display modules 110, for example 10-30 (e.g., 15, 20, 25, 30), that are held in place on its chassis 104 by magnets 132. The magnets 132 are useful in securing the display modules 110 to the chassis 104 and reducing the vibrational effects that may otherwise be present if using non-magnet, mechanical fasteners. Reducing vibrational stress on the display modules 110 is particularly advantageous when mounting on a moving vehicle, as the system is subject to vibrations from the road, the engine, braking, etc.).

Figure 11:
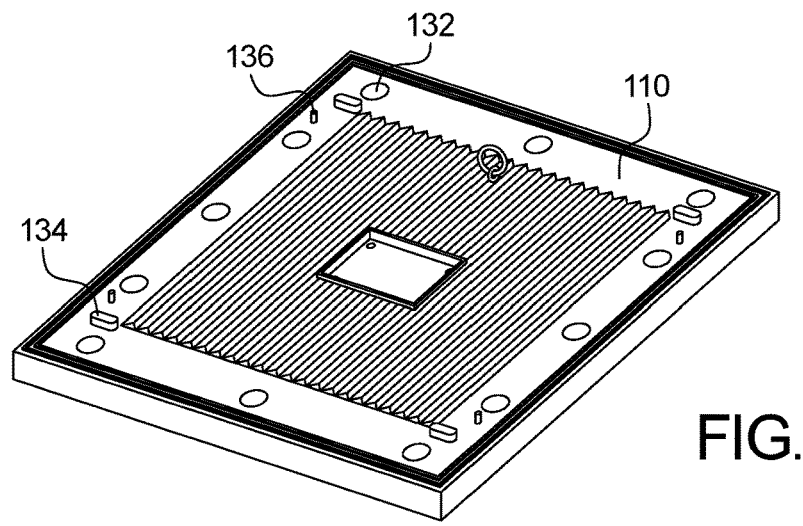
FIG. 11 illustrates an isometric back view of a display module.
Figure 12:
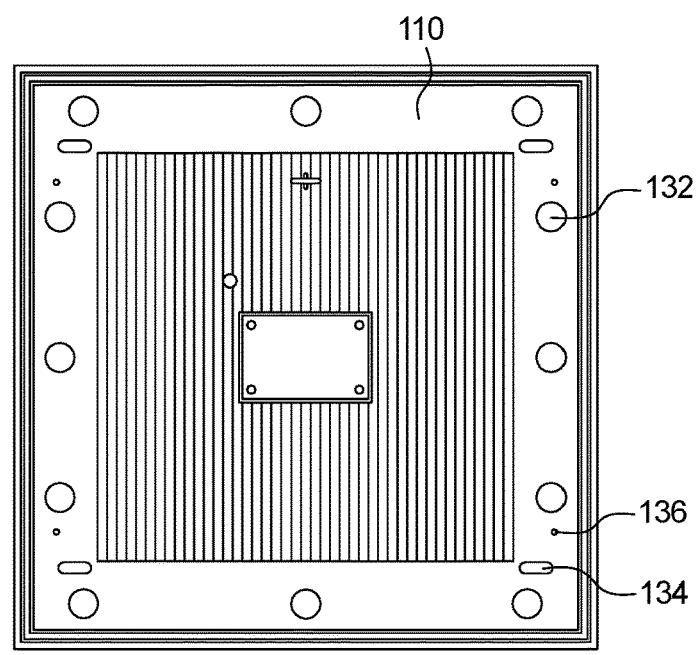
FIG. 12 illustrates a back view of the display module in FIG. 11.
Figure 13:
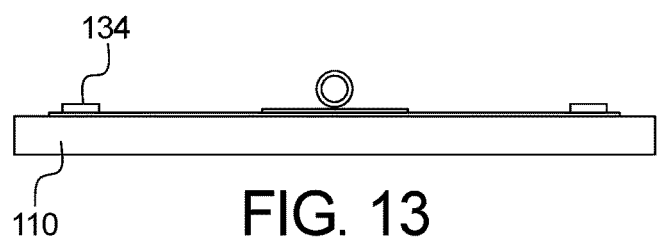
FIG. 13 illustrates a top view of the display module in FIG. 11.
Figure 14:
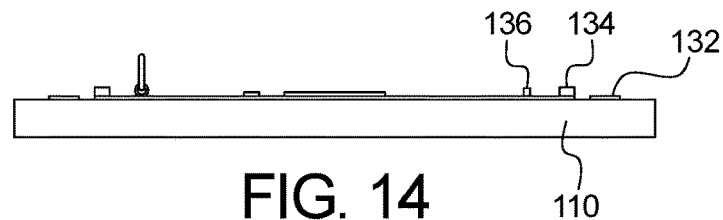
FIG. 14 illustrates a side view of the display module in FIG. 11.

Examples of a display module 110 is provided in FIGS. 11-14. FIG. 11 illustrates an isometric back view of a display module. FIG. 12 illustrates a back view of the display module in FIG. 11. FIG. 13 illustrates a top view of the display module in FIG. 11. FIG. 14 illustrates a side view of the display module in FIG. 11. In a preferred embodiment, the display modules are LED display modules having an LED display on their front face. In other embodiments, the display modules may incorporate other types of displays.

As shown, the display modules 110 may further be locked into place using a number of locking bars or similar locking mechanisms 134 that provide additional mechanical coupling to supplement the magnet coupling. In a primary example, each display module 110 includes four locking bars 134 that lock each display module 110 to a respective mounting bracket 130 on the chassis.

Moreover, each display module 110 may be located on the chassis 104, and relative to its respective mounting bracket 130, using one or more locating pins 136. The use of such pins 136 enables easier alignment of the display modules 110 and help to provide a more consistent display surface.

The front facing video display portion of each display module 110 can be encased in silicone to further protect the display modules 110 from weather and vibrational damage. The encasing eliminates the need for a protective glass cover, which helps to reduce the weight of the present system when compared to conventional systems.

Although the figures and examples focus on the advertising system applied to truck chassis, it should be understood the system can be used in connection with any motor vehicle or mechanized transportation means wherein the display module panels are mounted to any outer surface of the transportation structure As mentioned above, aspects of the systems and methods described herein are controlled by one or more controllers. The one or more controllers may be adapted to run a variety of application programs, access and store data, including accessing and storing data in the associated databases, and enable one or more interactions as described herein. Typically, the controller is implemented by one or more programmable data processing devices. The hardware elements, operating systems, and programming languages of such devices are conventional in nature, and it is presumed that those skilled in the art are adequately familiar therewith.

For example, the one or more controllers may be a PC based implementation of a central control processing system utilizing a central processing unit (CPU), memory and an interconnect bus and GPS. The CPU may contain a single microprocessor, or it may contain a plurality of microprocessors for configuring the CPU as a multi-processor system. The memory may include a main memory, such as a dynamic random access memory (DRAM) and cache, as well as a read only memory, such as a PROM, EPROM, FLASH-EPROM, or the like. The system may also include any form of volatile or non-volatile memory. In operation, the memory stores at least portions of instructions for execution by the CPU and data for processing in accord with the executed instructions.

The one or more controllers may also include one or more input/output interfaces for communications with one or more processing systems. Although not shown, one or more such interfaces may enable communications via a network, e.g., to enable sending and receiving instructions electronically. The communication links may be wired or wireless.

The one or more controllers may further include appropriate input/output ports for interconnection with one or more output mechanisms (e.g., monitors, printers, touchscreens, motion-sensing input devices, etc.) and one or more input mechanisms (e.g., keyboards, mice, voice, touchscreens, bioelectric devices, magnetic readers, RFID readers, barcode readers, motion-sensing input devices, etc.) serving as one or more user interfaces for the controller. For example, the one or more controllers may include a graphics subsystem to drive the output mechanism. The links of the peripherals to the system may be wired connections or use wireless communications.

Those skilled in the art will recognize that the one or more controllers also encompasses systems such as host computers, servers, workstations, network terminals, and the like. Further one or more controllers may be embodied in a device, such as a mobile electronic device, like a smartphone or tablet computer. In fact, the use of the term controller is intended to represent a broad category of components that are well known in the art.

Hence aspects of the systems and methods provided herein encompass hardware and software for controlling the relevant functions. Software may take the form of code or executable instructions for causing a controller or other programmable equipment to perform the relevant steps, where the code or instructions are carried by or otherwise embodied in a medium readable by the controller or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as the memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a controller can read programming code and/or data. Many of these forms of computer readable media may be involved in carrying one or more sequences of one or more instructions to a processor for execution.

It should be noted that various changes and modifications to the embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

The invention claimed is:

1. An electronic display device comprising:
a chassis including a plurality of mounting elements and an antenna, a power supply, a controller, a media player, a gateway, and a terminal; and
a display panel comprising a plurality of display modules mounted to the mounting elements, wherein each display module includes a video display on a front surface of the display module and is positioned relative to the chassis using one or more locating pins located on a back surface of the display module that cooperate with one or more receiving holes in a front surface of the mounting elements, is magnetically secured to the chassis, and is locked in place relative to each respective mounting element using a locking mechanism, such that each individual display module may be secured or removed from the chassis independently;
wherein the controller causes the media player to display media content on the display panel.

2. The electronic display device of claim 1, wherein each display module includes an LED video display.

3. The electronic display device of claim 1, wherein at least the front surface of each display module is covered by a silicone covering.

4. The electronic display device of claim 1, wherein the chassis is secured to a rear door of a semi-tractor trailer.

5. The electronic display device of claim 4, wherein the electronic display device includes two chassis and two display panels, each secured to a rear door of a semi-tractor trailer.

6. The electronic display device of claim 1, wherein the chassis includes a channel that accommodates one or more vertical locking bars that span a height of the chassis.

7. The electronic display device of claim 1, wherein the media content displayed on the display panel is updated in response to geolocation data received through the antenna.

8. An electronic display device comprising:
a first chassis and a second chassis, each mounted to a respective first and second rear door of a semi-tractor trailer, wherein each chassis includes a plurality of mounting elements and at least one of the first chassis and the second chassis includes an antenna, a power supply, a controller, a media player, a gateway, and a terminal, further wherein each chassis includes a channel that accommodates one or more vertical locking bars that span a height of the chassis; and
a first display panel and a second display panel, each comprising a plurality of display modules mounted to the mounting elements of the first chassis and the second chassis, wherein each display module includes a video display on a front surface of the display module and is positioned relative to the chassis using one or more locating pins located on a back surface of the display module that cooperate with one or more receiving holes in a front surface of the mounting elements, is magnetically secured to the chassis, and is locked in place relative to each respective mounting element using a locking mechanism, such that each individual display module may be secured or removed from the chassis independently, further wherein at least the front surface of each display module is covered by a silicone covering;
wherein the controller causes the media player to display media content on the first display panel and second display panel.

9. The electronic display device of claim 8, wherein the media content displayed on the first display panel and second display panel is updated in response to geolocation data received through the antenna.

* * * * *